Oct. 19, 1937.  W. A. SESSOMS  2,096,384
TURPENTINE HACK AND PULLER
Filed Dec. 7, 1936  4 Sheets-Sheet 2

Oct. 19, 1937.　　　W. A. SESSOMS　　　2,096,384
TURPENTINE HACK AND PULLER
Filed Dec. 7, 1936　　　4 Sheets-Sheet 3

Inventor:
William A. Sessoms
Akul M. Pedersen
Attorney.

Oct. 19, 1937.  W. A. SESSOMS  2,096,384
TURPENTINE HACK AND PULLER
Filed Dec. 7, 1936  4 Sheets-Sheet 4

Inventor:
William A. Sessoms
Aksel M. Pedersen
Attorney.

Patented Oct. 19, 1937

2,096,384

UNITED STATES PATENT OFFICE 2,096,384

TURPENTINE HACK AND PULLER

William A. Sessoms, Bonifay, Fla.

Application December 7, 1936, Serial No. 114,706

26 Claims. (Cl. 30—121)

This invention relates to a cutting tool particularly adapted for the chipping of turpentine gum bearing trees, and more particularly to a turpentine hack and puller which is adapted to make thin streaks or cuts on such trees with precision, so as to produce, over a period of years, the maximum yield of turpentine gum or resin from such trees.

It has been discovered by a long series of experiments that the total yield of gum or resin from turpentine-bearing trees, as from the long leaf pine or Southern pine, varies to a very large extent with the size or thickness of the cuts and also with the depth thereof. It has been found that the total yield over a period of three years or more is appreciably greater with narrow and relatively shallow cutting than with the thicker and deeper cuts. It has been discovered that a narrow cutting produces as much gum as the thicker cutting and, since the use of narrow cutting permits more cuttings on a tree, the yield over a period of years is increased. Also it has been discovered that shallow cutting produces less injury to the vitality of the tree than that caused by deeper cutting, resulting in an increased yield of gum over a period of years.

The cuts are preferably made through the bark and cambium layer into the sap wood to a depth of about one-half inch average depth into the sap wood which serves to free or open the principal resin ducts near the surface and then to produce a flow of the resin or gum.

Heretofore it has been customary in making the low cuts, or cuts near the base of the tree, to employ a turpentine hack of the usual simple form and to employ a separate tool, known as a turpentine puller, for the higher cuts, or cuts which are not easily within reach with a turpentine hack.

The cuts which are made by means of the tools now commonly employed vary to a great extent both in the thickness of the cut and the depth to which the knife penetrates, the ordinary workman employed for the tapping or cutting of the trees being unable to make the thickness of the cuts with an accuracy within a quarter inch and frequently is unable to make the successive cuts with a precision of within one half inch. The depth of the cuts, or the depth to which the knife penetrates, varies also to a considerable extent, the cuts often varying in depth as much as a half inch.

Many attempts have been made to produce turpentine hacks and pullers which may be easily manipulated with uniformity in cuts but none of the tools of the prior art have been entirely satisfactory. None of these tools, furthermore, may be used with an accuracy required for cutting a tree to produce the maximum yield of turpentine over a long period of time.

There is known a form of turpentine hack, which has a short, curved guide mounted behind the cutting blade, it being intended to have the guide ride on the edge of the bark. The cutting of turpentine-bearing trees by means of this tool produces inaccurate cuts for the reason that the tool has to be used with a free-hand stroke, which causes misplaced cuts just as is the case with the simpler tool that has no guide. The guide portion is too short to properly guide the tool. Moreover in this form of turpentine hack, the depth of cut into the sap-wood is not controlled within a definite limit for the reason that the top of the guide used for this purpose rests on the bark, which is of varying thickness on different trees and causes the depth of cut into the sap-wood to vary as the thickness of bark varies.

It has been found that the total yield of a tree varies very greatly with variations in the depth and thickness or average depth and thickness of the cuts or chips. It has been found by extended experiment that the maximum yield with the least injury to a tree is obtained by making the cuts about one-fourth of an inch thick and about one-half an inch average depth into the sap-wood, this depth varying, of course, throughout each streak, the minimum depth being at the beginning and end portions of the cut, and the maximum depth being at about the center. It will be understood that these cuts are made at an angle to each other in the form of a V.

One of the objects of the present invention is to provide a form of cutting tool which is adapted in both skilled and unskilled hands to cut the streaks in turpentine gum bearing trees with the required precision so as to produce substantially the maximum yield of turpentine gum or resin over a period of years, and to produce the minimum injury to a tree.

Another object of the invention is to provide a form of cutting tool which may be readily used by unskilled persons for both the low and high cuts on a tree without necessitating a change of tools.

Another object of the invention is to provide a form of turpentine hack and puller in which the cutting tool may be reversed so as to present a fresh cutting edge in case of breakage of one of the cutting edges. It will be understood that in the cutting of turpentine-bearing trees, the workmen occasionally break or damage their cutting tool and are then forced to lose the rest of that day's work because of having to return to camp headquarters to obtain a new one, or to repair the old one.

One form of tool hereinafter fully described permits the knife member on the body portion of the tool to be reversed in case of breakage of the edge so as to present a fresh unbroken edge. (See Figs. 1 to 11 inclusive.)

Another object of the invention is to provide a form of cutting tool having a guiding edge or guide member which is longitudinally positioned on or in connection with the working tool so as to space the knife edge at a proper distance to obtain the desired depth of cut into the tree. In the preferred form of the device herein described this guiding edge or guiding surface is preferably a ridge or edge on the body portion which serves as a guide in producing a straight cut by the knife member by being pressed against the face, or cut out vertical portion, of the tree during the cut.

The preferred form of the device includes also a longitudinal guide portion above the body portion extending rearwardly and below the cutting edge so as to ride on the under surface of the last cut or streak on the tree, so that as the tool is brought forward, being guided by the lateral edge or surface, the curved or U-shaped cutting portion of the knife member produces the next cut or streak of the proper thickness.

Another object of the invention is to provide means whereby the thickness of the chip may be varied in accordance with a predetermined desired thickness. In accordance with this object of the invention, means are provided in the preferred form of the invention by which the longitudinal guide portion above the body portion may be varied in elevation from the body portion, whereby the desired thickness of the chip may be obtained.

Other objects of the invention will be apparent from the detailed description and features of the invention as hereinafter set forth.

The various features of the invention are illustrated in the accompanying drawings, in which:

Fig. 11 is a fragmentary view of the handle end of the tool as shown in Figs. 1 and 2 with the grip portion removed and an extension handle attached for use of the tool in making high cuts, or when used as a puller;

Referring more in detail to the drawings, the preferred form of the invention comprises a body portion 2 having a downwardly inclined forked portion 4 adapted to carry a removable knife blade 6 thereon and a handle portion 8.

In the preferred embodiment of the invention, the handle end 8 of the device is preferably of wood and is connected to the body portion of the tool by any suitable means. The body portion of the tool is preferably of metal, as steel, for example, and the portion 8 may be mounted on an extension of the body portion.

The handle 8 of the device preferably carries a grip portion 10, which may be made of metal and is preferably formed with a hollow body portion 12 so that the grip portion may be weighted to any desired extent, serving to produce the desired balance so that it may be easily handled and serving also to give sufficient weight to the tool so as to provide the desired momentum during use. The grip member 10 is preferably screwed onto a screw member 14 which extends through the handle portion 8, thus connecting the grip 10 to the body portion of the tool.

In order to permit the tool to be readily shifted in use from one side to the other, for making both left hand and right cuts, a swinging handle member is provided, the handle 16 being attached to a swinging member 18, which in turn is preferably hinged to a connection 19 within an opening or cut-out portion 20 in the body 2 of the tool. The connection 19 is preferably supported on a bolt member 22 (see Fig. 7) suitably mounted within the cut-out portion, as by means of a metal bearing member 24, as shown more particularly in Fig. 9, and pivotally fastened to member 18 by a pin connection 21.

The steel blade or knife member 6 preferably comprises an inverted W-shaped member having curved or U-shaped cutting portions 26, 28 on each side of the cutting mid-portion of the knife member, the curved portion serving to cut the streaks or chips with guided movements of the tool, by which one or the other of the curved cutting portions cuts the streak, depending upon whether the cut is made on the right hand or left hand side of the face of the tree.

In order to permit reversing the blade in position, so as to provide a new cutting edge when desired, the knife is preferably made symmetrical in form, the forward edge being preferably similar to that of the rear edge and the seating portion being also of a form so as to permit readily reversing the position of the knife and to hold the knife rigidly in position so that the blade will not be shifted during the cutting stroke.

In order to guide the knife member during the cutting operation, guiding means are provided extending longitudinally and preferably in substantially a straight line through a substantial portion of the body of the device. For this purpose a guiding surface may be employed extending rearwardly and laterally of the cutting edge, the guiding surface contacting with the face or cutout portion of the tree during the movement of the tool and thus determining the depth of the cut made with the cutting portion of the knife.

Figure 7:
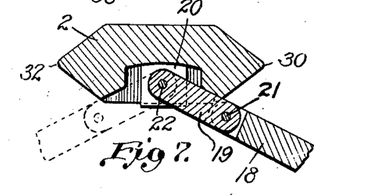
Fig. 7 is a sectional view taken on section line 7—7 of Fig. 3 showing the swinging handle and cut-out portion in the body portion of the tool to permit movement of the handle from one side to the other during use of the tool.
Figure 8:
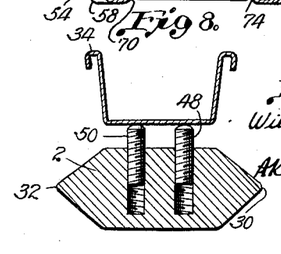
Fig. 8 is a sectional view taken on section line 8—8 of Fig. 3 showing the longitudinal guide member held in predetermined position by spacer studs.
Figures 10, 12:
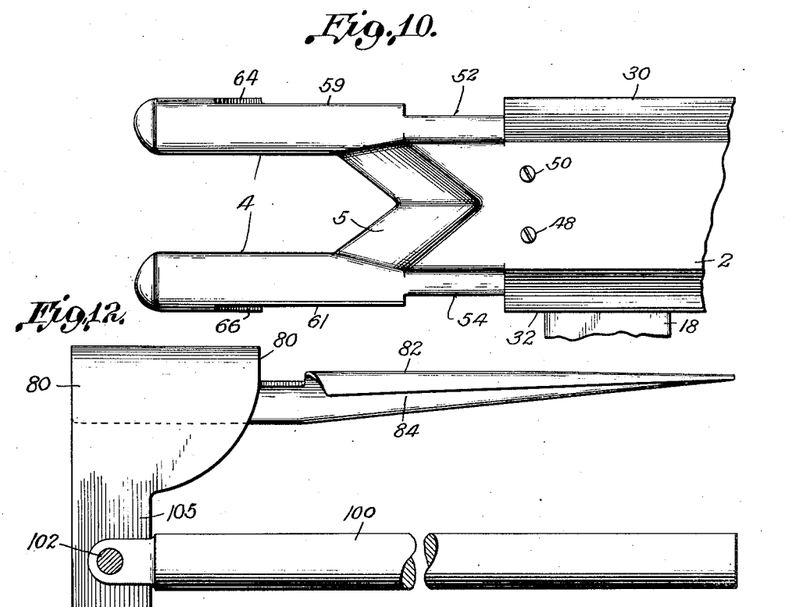
Fig. 10 is an enlarged fragmentary view showing the knife end portion of the device of Fig. 1 with the knife member removed.
Fig. 12 is a view in elevation, partly in section, showing a right hand tool or right side of a modified form of the invention.

In the preferred form of the invention laterally extending edges or guide members 30 and 32 are provided, as shown more particularly in Fig. 7 of the drawings, which serve to ride on the face of the tree during the use of the tool and to guide the cutting edge of the knife during the cutting stroke. It will be understood that during the cutting operation, the tool may be inclined to a greater or less extent around one of the working edges 30 or 32 as a pivot, so that a greater or less depth of cut into the tree may be obtained.

When the tool is used in making an oblique cut from left to right, for example, in a downwardly direction, the guiding edge 30 contacts with the face or cut-out portion of the tree, whereas during a cutting stroke from right to left, in a downwardly direction, the guiding edge 32 is in contact with the face.

In order also to guide the tool in a vertical plane to assure obtaining the desired thickness (height) of cut during the cutting stroke, I further provide a guide member 34 having guide edges 36 and 38, the guide member being preferably adjustably positioned above the body portion 2 of the tool and extending rearwardly below the cutting edge in a plane substantially parallel with the body portion. The member 34 is preferably in the form of a channel member, the sides of which carry the parallel longitudinally extending edges 36 and 38 which are preferably at least six inches in length, providing guiding edges on each side of the tool which cooperate with the corresponding right or left curved portion of the knife during a cutting stroke.

The member 34 is preferably of sheet steel and may be attached to the body portion 2 of the device by any suitable adjustable means, as by means of pins or screws 40, 42 and slots 41, 43, the screw members 40 and 42 being preferably held in adjusted position by means of wing nuts 44 and 46, by means of which the member may be raised or lowered in position in conjunction with set screws or spacer studs 48 and 50. These stud members are preferably positioned in the body portion adjacent the knife member so that adjustment of the studs determines the thickness of the cut by positioning the forward end of the longitudinal guide portion with relation to the cutting portions of the knife edge. The member 34 by reason of the adjustable members 40 and 42 is easily and quickly demountable for sharpening the tool.

The knife member is preferably shaped in the form of a W as above stated, in order that it may be used for any thickness of bark. It will be apparent that if the tool is used on a tree of unusual thickness of bark, the near edge and the curved or U-shaped portion, as 28, will cut in the same manner as a tree of average thickness of bark but the side portion 29, together with the loop portion 31 and the side 33 may, in exceptional cases, be employed in the cutting operation.

It will be apparent, however, that the form of the knife may be varied, as may be desired, as will be apparent to those skilled in the art. A separate or individual knife member might be used on each side of the tool, for example, by separately, removably fastening the knife portion in position, although I prefer the construction as described, and as illustrated in Figs. 1 to 11 of the drawings.

As above stated, the forward portion 4 of the body portion is preferably downwardly inclined so as to tilt the cutting edge upwardly and to provide an initial biting edge so as to hold the cut.

In order to provide against the contingency of serious loss of time due to the breaking of a cutting edge, the knife member is preferably provided with cutting edges at both ends so as to permit reversing the position of the knife blade in the event that the forward edge is injured or becomes broken.

It is desirable also to provide means whereby the position of the knife blade may be readily changed without use of nuts, and bolts, or such fastening members as would require considerable effort on the part of unskilled labor in reversing the position of the knife, or such fastening means as would require the use of wrenches, or tools, that are not carried by the laborer while he is at work. In order to provide such adjustability, the forward end of the body portion of the tool is provided with slots 52 and 54 of a depth and width to permit passage of the inturned portions 56 and 58 of the side members of the knife 6, thus surrounding the forward portion and permitting sliding movement of the knife member into place around the two prongs of the fork member 4, being held in place against the shoulders or edges 64 and 66, (see Fig. 10).

Figures 1, 2, 4, 9:
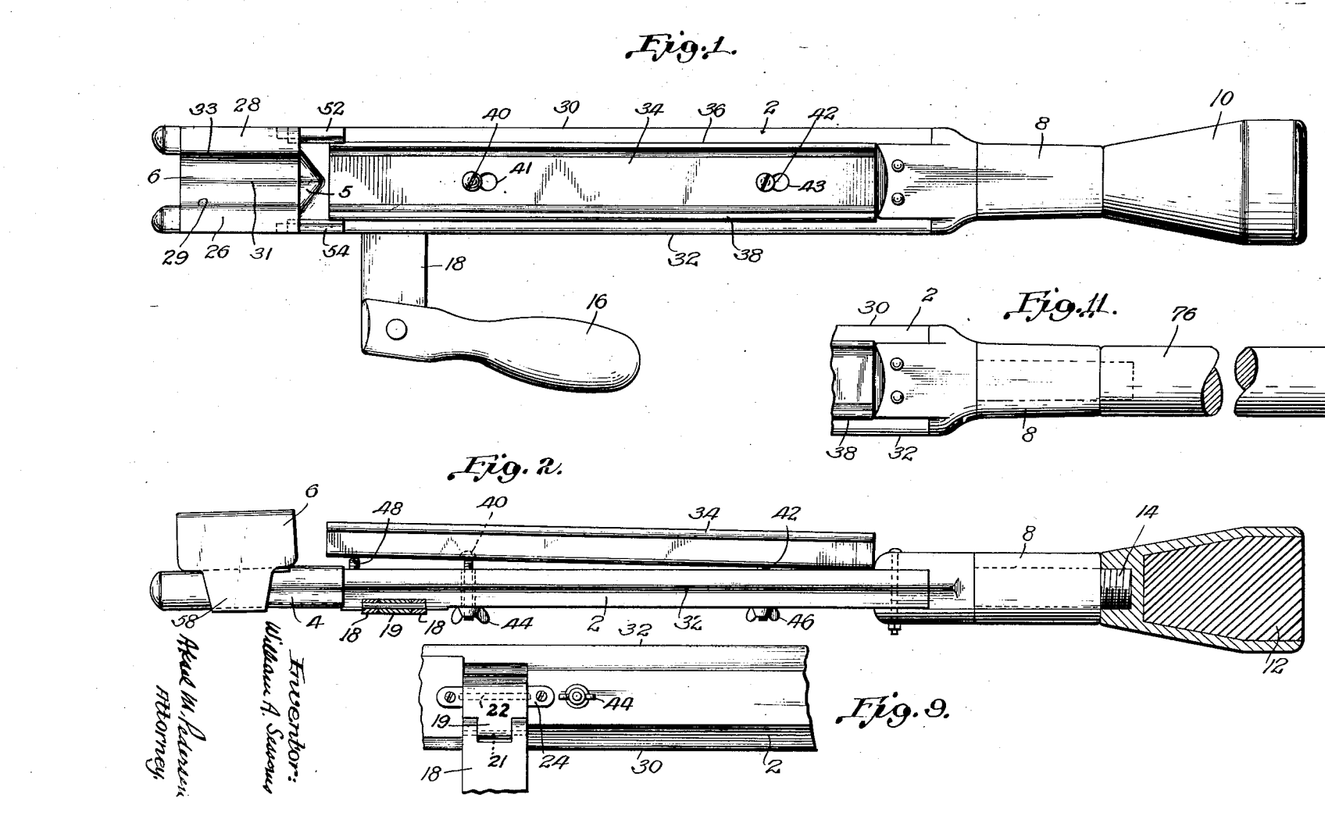
Fig. 1 is a plan view of the preferred form of the invention.
Fig. 2 is a view in elevation, partly in section, of the device shown in Fig. 1.
Fig. 4 is a sectional view taken on the section line 4—4 of Fig. 3.
Fig. 9 is a fragmentary enlarged view showing means for connecting the swinging handle in the body portion of the tool.
Figure 3:
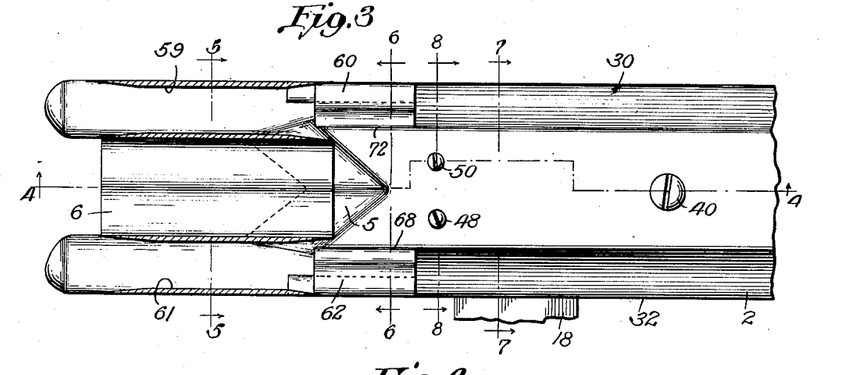
Fig. 3 is an enlarged fragmentary view partly in section showing the knife end portion of the device shown in Fig. 1.
Figure 4:
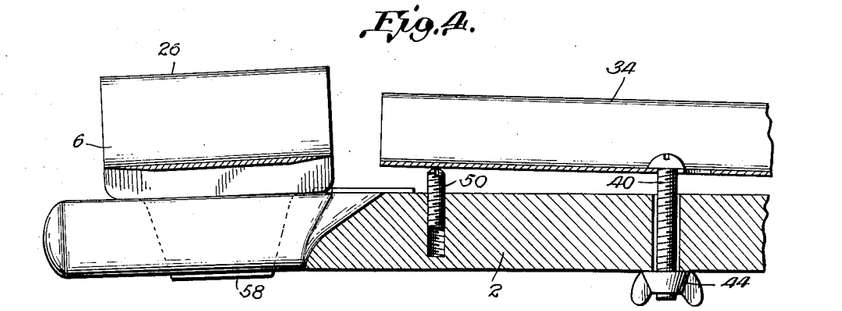
Figure 5:
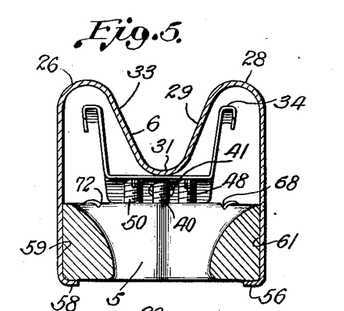
Fig. 5 is a sectional view taken on the section line 5—5 of Fig. 3.
Figure 6:
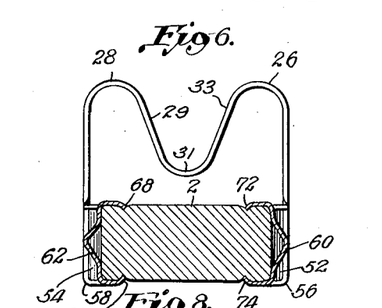
Fig. 6 is a sectional view taken on the section line 6—6 of Fig. 3.

It will be understood that the knife member 6 is preferably of tool steel and may be held in position on the fork member by suitable holding means, although I preferably provide spring holding members 60 and 62 as shown more particularly in Fig. 6 of the drawings. The ends of the spring members 60 and 62 fit into grooves 68, 70 and 72, 74 on the upper and lower sides of the body portion as indicated in Fig. 6 of the drawings.

The forward end of the tool or forked portion 4 preferably has a beveled portion 5 sloping downwardly and outwardly so that as chips are removed during a cutting stroke these will fall below the knife edge and pass down the slope or chute so as to be removed without clogging the cutting end of the tool.

In making cutting strokes which are out of reach with the tool when used as a hack, or in other words, in order to use the tool as a puller I preferably remove the grip portion 10 by unscrewing the same from the screw member 14 and replace the grip member with an extension handle 76 which is preferably of wood carrying a female thread to fit the male thread on the screw 14. It will be obvious that the extension handle may be made of any suitable length.

While the form of the invention above described is the preferred form, it will be apparent that various changes or modifications may be made in the constructions so as to provide guiding means by which the knife member may be guided in much the same way as above described, and by which various advantages in simplicity of construction may be obtained.

In Figures 12 to 15 inclusive, I have illustrated a modified form of the invention by which certain constructional advantages are obtained.

Figure 13:
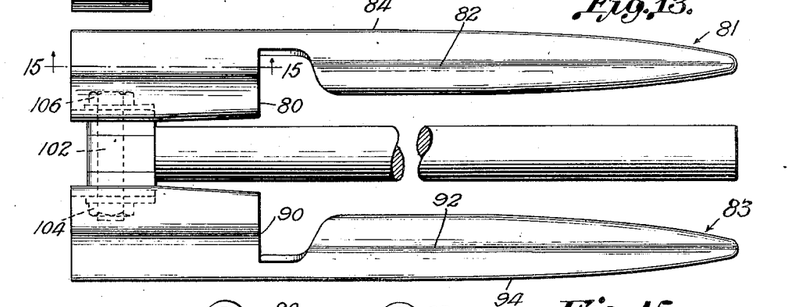
Fig. 13 is a plan view of the form of device shown in Fig. 12.
Figure 14:
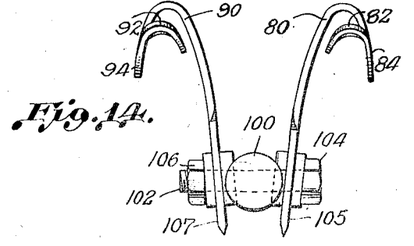
Fig. 14 is a front end view taken from the right in Fig. 13.
Figure 15:
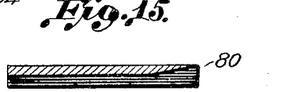
Fig. 15 is a fragmentary sectional view taken on the line 15—15 of Fig. 13.
Figure 16:
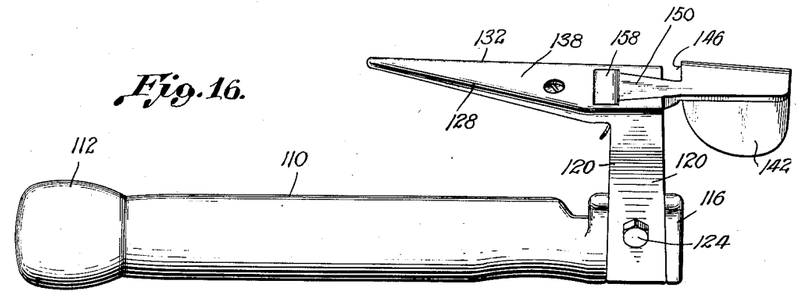
Fig. 16 is a view in elevation of another modification of my invention.
Figure 17:
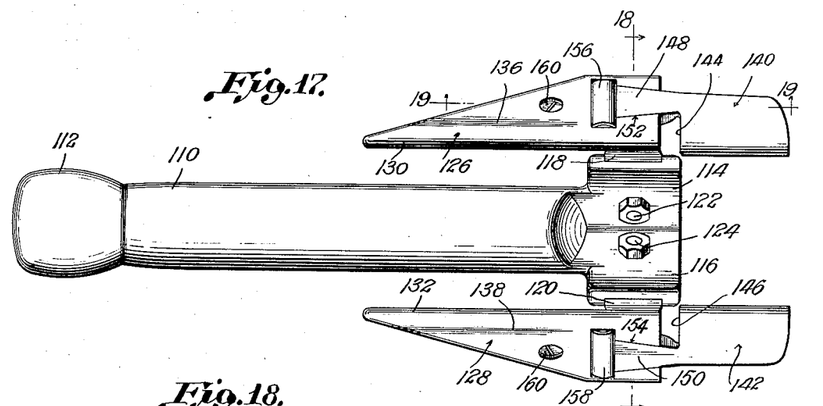
Fig. 17 is a plan view of the form of turpentine hack and puller shown in Fig. 16.

This modified form comprises a unitary structure for the cutter or knife 80, 90 with the guide members 81 and 83, respectively, on each side of the tool, as will be apparent from Fig. 13, in which the surfaces 82, 92, are raised portions or edges adapted to ride or slide on the under side of the streak to guide the knife edge so as to accurately determine the thickness of cut up the tree and the lateral surfaces or edges 84 and 94 are adapted to ride on the face of the tree to guide the knife edge so as to accurately determine the depth of cut in the tree.

The guide members or blades 81 and 83 having the guide surfaces or edges 82, 84 and 92, 94 respectively are preferably similar and symmetrically mounted on the body member or handle 100, the guide blades being designed or constructed so that the edges 82 and 92 which are to ride on the under side of the streak, and the lateral edges 84 and 94 which are to ride on the cut-out portion have a length of about six inches for operation on trees of the ordinary size. If the device is to be used for trees of small diameter, the guide blade may be about five inches long and if it is to be used for trees of large diameter the guide blade may have a length up to about ten inches, if desired.

In this form of the device two separate members are used, one for each side of the tool and the guide members or blades are integrally connected to the knife members. The knife members 80 and 90 are preferably mounted on a handle having a body member 100, being fastened thereto by suitable fastening means, as by the use of a bolt 102 having a head 104 and a nut 106 which holds the arm members 105 and 107, integrally connected to the knife members 80 and 90, in place. The handle member or body portion 100 may be of any suitable shape or form and may be provided with grooves or cut-out portions so that the knife member may be readily placed in adjusted position and rigidly held in place.

Referring to Figures 16 to 19 inclusive of the drawings, a second modification of the device is shown which is similar in some respects to the form of the device shown in Figures 12 to 15 inclusive. In the form shown in Figures 16 to 19, the guide blades are united with the knife members, as is the case in the first modification of the invention, but are formed so as to permit removal of the knife members from the guide members and thus from the tool without the necessity of detaching the guide members from the tool.

It will be obvious from the construction shown in Figures 12 to 15 inclusive that in order to replace a dull knife or a broken knife edge it is necessary to disconnect one or both of the knife members and guide blade connected thereto and to replace the part by another knife member and guide blade.

Figure 18:
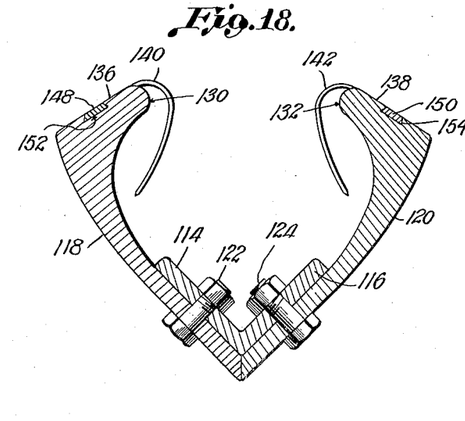
Fig. 18 is a cross sectional view taken on the section line 18—18 of Fig. 17.
Figure 19:
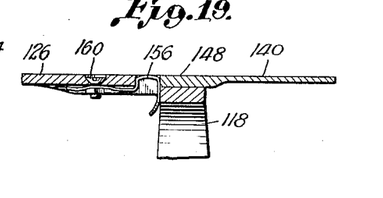
Fig. 19 is a sectional view taken on the section line 19—19 of Fig. 17.

In the form of construction shown in Figures 16 to 19 inclusive, it will be apparent that in order to replace a dull knife or a broken knife, it is only necessary to depress the spring member 156 or 158, or other holding means and thereafter to disconnect and remove the damaged or dull knife blade and to insert the new part in place, the spring member returning to its normal or holding position as shown in Figure 19 of the drawings.

Referring more in detail to the drawings, this modification of the device has a body member 110 which is preferably about a foot in length for ordinary use. Obviously the body member may be made any desired length so as to permit being used as a puller, as well as a turpentine hack. The body member preferably has an enlarged end portion 112 serving as a handle or grip, which is of particular advantage when the device is used as a turpentine hack. The forward end of the body member is preferably V-shaped, as shown more particularly in Figure 18, having branches 114 and 116 to which the guide blades may be attached by means of arm members 118 and 120 which extend outwardly from the body members at an angle of substantially ninety degrees, although obviously this angle may be varied as may be desired.

The arm members 118 are preferably curved inwardly on each side of the device so that the cutting edges of the knife members are inclined toward each other, as indicated more particularly in Figure 18 of the drawings. The arm members 118 and 120 may be interconnected or integral, if desired, or they may be separate and attached to the V-shaped portion of the body member by separate fastening means, as by bolts 122 and 124, for example, as shown in the drawings. In the form of construction shown, the arm members 118 and 120 are formed integral with the guide blades 126 and 128 which are of substantially the same form as the guide blades shown in Figure 13, and are preferably of a length of about six inches, so as to permit the making of accurate narrow cuts both when the device is used as a turpentine hack and when used as a puller.

The guide members 126 and 128 each have rectilinear edges or surface portions 130 and 132, corresponding to the edges or surfaces 82 and 92 shown in Figure 13 of the drawings, in order to guide the tool in riding on the under surface of the last streak formed. The guide members are also provided with lateral edges or surfaces 136 and 138 adapted to contact with the face or cut-out portion of the tree and to guide the tool thereon during the cutting stroke.

It will be noted that the nose portions or forward ends of the guide blade are rounded so as to avoid cutting into the tree, and serve to prevent the guide member from catching on or becoming imbedded in the bark of the tree during a cutting stroke.

The separate knife members 140 and 142 in this form of the invention may be formed in a substantially V-shape or, more accurately, in a flaring U-shape as shown more particularly in Figure 18 of the drawings and are provided with cutting edges 144 and 146.

In order to fasten the knife members in position, they are preferably provided with integral forwardly extending arm members 148 and 150, which are adapted to fit into corresponding recesses 152 and 154 in the arms 118 and 120 or the corresponding guide blades. The preferred mode of construction comprises beveled side portions in the recesses and corresponding tapering members 148 and 150 which are held in position at the forward ends by spring members so as to prevent the blades from becoming disconnected during use but permitting the knife members to be readily removed. For this purpose the spring members 156 and 158 are preferably attached to the guide blades by means of bolt members 160, as indicated in Fig. 19 of the drawings.

It will be understood that when the tool is in use, the strain on the knife member is in a direction to more rigidly hold the knife member in position; that is, the force during use of the tool is toward the rear of the blade, thus tending to hold the knife member rigidly in place. When the pressure on the knife edge is released, the knife member is held in position by the corresponding spring member which engages the forward end of the corresponding arm, as shown.

It will be obvious that with this form of construction, the tool may be readily used on either side of the tree and may be readily shifted from a cutting position on one side of the tree to a cutting position on the other side. Moreover, knife members of this form may readily be carried by the operator for replacement purposes without danger, since the forward projecting arm member as 150 serves to protect the cutting edge, as 146, of the knife, and the cutting edge obviously may readily be further protected when not mounted in the tool by means of wooden caps or plugs or the like, as will be obvious to those skilled in the art.

It will be understood that various changes or modifications may be made in the form of my invention as shown without departing from the spirit and scope of the invention as defined in the claims.

Having thus described the invention what is claimed as new is:

1. A turpentine hack and puller comprising a body member, a knife member attached to the said body member and a long guide member having a rectilinear portion extending in front of and just below the cutting edge of the knife member, said guide member being positioned so as to permit riding on the face of a tree to guide the movement of the knife member during a cut.

2. A turpentine hack and puller comprising a body member, a knife member mounted on said body member, an elongated guide member extending below, in front of and to one side of said knife member, said guide member having a rectilinear portion of substantial length adapted to ride on the face of a tree to guide the movement of the knife member during a cut and a rectilinear portion on said guide member for guiding the tool during the cutting stroke to determine the thickness of the cut.

3. A turpentine hack and puller comprising a body member, a knife member having a curvilinear cutting portion attached to said body member, the knife member being mounted so that the cutting edge thereof is at substantially right angles with the longitudinal axis of the body member and an elongated guide member having a rectilinear edge below the said cutting edge, parallel to the said axis and in a position to determine the depth of cut during the cutting stroke, the said guide member being adapted to ride on the face of a tree through a substantial length of contact, permitting tilting the knife edge at different degrees of inclination to determine the depth of the next cut to be made.

4. A turpentine hack and puller comprising a body member, a knife member having a U-shaped cutting portion on each side thereof for the making of left-hand and right-hand cuts, the said knife member being connected to said body member so that the cutting edges of the U-shaped cutting portions lie in a plane at right angles to the axis of the said body member, a rectilinear guide portion below and in front of each of said U-shaped cutting portions parallel with the axis of said body portion, serving to guide the tool on the face of the tree during the making of cuts on both the right and left side of said face.

5. A turpentine hack and puller comprising a body member, a knife member positioned on one side of said body member and a plurality of guide members extending substantially the length of said body portion for guiding the tool during the cutting operation to provide a predetermined depth and thickness of cut.

6. A turpentine hack and puller comprising an elongated body member, a reversible knife member having a cutting edge on both the forward and rear ends thereof, said knife member being removably positioned at one end of said body member, a guide surface extending substantially the length of said body portion to guide the tool during the cutting operation to obtain a predetermined depth and thickness of cut.

7. A turpentine hack and puller comprising an elongated body member, a saddle shaped knife member having a cutting edge on both the forward and rear ends thereof, said member being removably positioned at one end of said body member and symmetrically shaped so as to permit reversing the position thereof to permit the rear end to be used as the cutting side and guide members extending substantially the length of said body portion for guiding the tool in two dimensions during the cutting operation to provide a predetermined depth of cut into the tree and a predetermined thickness thereof.

8. A turpentine hack and puller comprising an elongated body member, a saddle shaped knife member having curvilinear cutting portions on each side of the middle portion thereof, said knife member being removably positioned at the end portion of said body member, a guide portion extending substantially the length of said body portion for determining the depth of cut into the tree and a guide portion of substantial length adapted to ride on the under surface of the last cut portion of the tree for determining the thickness of the cut.

9. A cutting tool adapted particularly for the chipping of turpentine bearing trees which comprises a body member, a demountable knife member having curved cutting portions at both the forward and rear ends thereof, said knife member being mounted at one end of said body member, a longitudinal guiding surface extending rearwardly and laterally of the operative cutting edge, said guiding surface serving to contact with the face of the tree to determine the depth of the cut and a longitudinal guide portion above said body portion extending rearwardly and below the operative cutting edge, said guide portion sliding on the under surface of the last cut during use of the tool, whereby the thickness and position of the new cut is determined.

10. A cutting tool adapted particularly for the chipping of turpentine bearing trees which comprises a body member, a demountable saddle shaped knife member having curved cutting portions on each side of both the forward and rear ends thereof, said knife member being mounted at one end of said body member so that the said ends are substantially at right angles to the longitudinal axis of the said body member, a longitudinal guiding surface on each side of said body portion and extending forwardly and laterally of the operative cutting edge, said guiding edge serving to contact with the face of the tree to regulate the depth of cut and a longitudinal guide portion above said body portion but below said cutting edge adapted to slide on the under surface of the last cut, thus determining the thickness and position of the cut.

11. A cutting tool adapted particularly for the chipping of turpentine bearing trees which comprises a body member, a demountable knife member having a curved cutting edge at each side of the said body member, said knife member being mounted at one end of said body member, a longitudinal guiding edge integral with said body member on each side thereof extending rearwardly and to one side of the cutting edge, one of said guiding edges serving to contact with the face of the tree during a right hand or left hand cut and determining the depth of the cut, and longitudinal guide portions above said body portion extending rearwardly and below said cutting edge, one of said guide portions sliding, during use of the tool for making a right hand or left hand cut, on the surface of the last cut and determining the thickness and position of the next successive cut.

12. A cutting tool adapted particularly for the chipping of turpentine gum-bearing trees which comprises a body member, a demountable reversible knife member having curved U-shaped cutting portions on the forward and rear ends of the knife member, said cutting portions forming a continuous cutting edge on both ends of the knife member, said knife member being mounted on the forward end of said body member, a longitudinal guiding surface extending laterally and rearwardly of the cutting edge, said guiding surface having elements along the surface thereof constituting edges serving to contact with the cut-out portion of a tree and to space the said cutting edge into or out of the tree, thereby determining with a given inclination of the tool the depth of cut and a longitudinal guiding surface portion above said body portion extending forwardly of and below the said cutting edge, said longitudinal guiding portion being adapted to ride on the under surface of the last streak or cut on the tree for determining the thickness of the cut, whereby successive guided cuts may be made having predetermined thicknesses.

13. A turpentine hack and puller comprising a knife member, a body member attached to the said knife member and an elongated guide located at one side of the body member and below the knife member and extending through a distance of at least five inches, whereby the guide may ride on the face of a tree by contact of a rectilinear element of the guide member therewith, so as to accurately control the movement of the knife member and determine the depth of the cut.

14. A cutting tool adapted particularly for the chipping of turpentine bearing trees which comprises a body member, a knife member having a curved cutting portion, said knife member being mounted adjacent one end of the body member, a longitudinal guiding surface extending forwardly and laterally of the cutting edge, said guiding surface serving to contact with the face of the tree and determining the depth of the cut, an adjustable longitudinal guide above said body portion extending forwardly of and below said cutting edge, said longitudinal guide portion sliding, during use of the tool, on the under surface of the last cut for determining the thickness and position of the next successive cut, and means for varying the elevation of the adjustable guide with relation to the cutting edge so as to obtain a predetermined desired thickness of cut.

15. A cutting tool adapted particularly for the chipping of turpentine bearing trees which comprises a body member, a knife member having a curved cutting portion, said knife member being mounted adjacent one end of the body member, a longitudinal guiding surface extending forwardly and to one side of the cutting edge, said guiding surface serving to contact with the face of the tree and determining the depth of the cut, an adjustable longitudinal guide above said body portion extending forwardly of and below said cutting edge, said longitudinal guide portion sliding, during use of the tool, on the under surface of the last cut and determining the thickness and position of the next successive cut, means for varying the elevation of the adjustable guide with relation to the cutting edge so as to obtain a predetermined desired thickness of cut and means for easily and quickly detaching the adjustable guide so as to permit sharpening the cutting edge with a whetstone.

16. A turpentine hack and puller comprising a knife member having a curvilinear cutting portion, a body member integral with said knife member, a handle attached to said body member, said knife member being so mounted with relation to the handle that the plane of the cutting edge is at right angles with the longitudinal axis of the handle, a guide member extending substantially parallel with the handle and providing one surface adapted to ride on the face of the tree and another surface adapted to ride on the under cut surface of the sap-wood to serve as a two dimensional guide for the knife member.

17. In a turpentine hack and puller the subcombination comprising a knife blade having a cutting edge of curvilinear form, a guide member projecting forwardly from the cutting edge and having an extended surface for contacting with the face of the tree to guide the knife edge in the cutting stroke to determine the depth of the cut and a rounded portion at right angles therewith adapted for passing under the last cut for regulating the thickness of the next cut.

18. In a turpentine hack and puller the subcombination comprising a knife blade having a U-shaped cutting edge, a unitary guide member projecting forwardly from the cutting edge in a plane at substantially right angles with the face of the cutting edge and having an extended surface for contacting with the face of the tree to guide the knife edge in determining the depth of cut in the cutting stroke and a rounded portion above said surface and extending at right angles to the cutting edge adapted for riding on the under surface of the last streak for determining the thickness of the cut.

19. A turpentine hack and puller adapted for cutting a full "shade" streak sloping upwardly and inwardly in the tree, permitting the gum to drip directly into a receiving vessel which comprises a knife member having a curved cutting edge, a body member attached to the said knife member, an elongated guide member having a rectilinear edge located to one side of the body member and below the knife member so as to permit riding on the face of a tree to guide the movement of the knife member so as to form an upwardly and inwardly sloping cut and means for adjusting the position of the said guide member to determine the depth of the cut.

20. In a turpentine hack and puller, a knife member having a curved knife edge portion, a guide member extending forwardly of said knife edge for determining and regulating the thickness of a cut, means for adjusting the position of the guide member with relation to the knife member and means for readily detaching and attaching the guide member in place.

21. In a turpentine hack and puller, a body member, a removable knife member on said body member, means for rigidly holding the knife member in place on said body member, an adjustable guide member having an elongated guiding surface thereon, means for raising and lowering the position of the guide member with relation to the cutting edge of the knife member and means for attaching and detaching the said guide member.

22. A turpentine hack and puller comprising a knife member, a body member attached to the said knife member and an elongated guide member located below the knife member extending forwardly a distance of at least five inches, whereby the guide member may accurately control the movement of the knife member to determine the depth of the cut.

23. A turpentine hack and puller comprising a body member, a plurality of knife members mounted on said body member, a guide member of substantial length mounted adjacent each of said knife members below the normal cutting edge portions of the knife members extending forwardly of the cutting edge so as to provide a rectilinear guide surface to control the movement of the cutting edge in a substantially rectilinear path during the cutting stroke and to maintain the cutting portion of the knife edge at a predetermined distance from the under surface of the last streak so as to obtain a predetermined thickness of cut.

24. In a device of a kind described, a body member, an integral knife and guide member having a shank adapted for fastening to the body member of the tool, a forwardly curved knife edge portion having a flaring U-shape, and a guide member integral with the knife member extending forwardly from and below the knife edge, said guide member being curved and positioned so as to fall within the loop or U-shaped cutting edge of the knife member and having a guiding rectilinear edge of a length of at least five inches in advance of the said cutting edge for guiding the knife edge during the cutting operation.

25. In a device of the kind described, a body member, a guide member having a forwardly extending guide blade of at least five inches in length and a rectilinear surface portion at the upper part thereof, for guiding the knife edge during a cutting stroke, an inwardly extending arm member connected to said guide member, means for fastening said arm member to the said body member, a demountable knife member adapted to be removably attached to said guide member, and means for holding the knife member in position so that during the cutting action the strain on the holding means is relieved.

26. A turpentine hack and puller comprising a body member, a knife member mounted on said body member, elongated, rectilinear guide means extending below, in front of and laterally of the knife member to guide the movement of the knife member on the face of a tree during a cutting stroke and rectilinear guide means extending below and in front of the knife member for guiding the tool during the cutting stroke to determine the thickness of the cut.

WILLIAM A. SESSOMS.